July 2, 1940.  C. M. YODER  2,206,068
MACHINE FOR PRODUCING SHAPES
Filed Aug. 28, 1936   5 Sheets-Sheet 1

INVENTOR
Carl M. Yoder
BY
ATTORNEY

July 2, 1940.                    C. M. YODER                    2,206,068
                         MACHINE FOR PRODUCING SHAPES
                          Filed Aug. 28, 1936          5 Sheets-Sheet 2
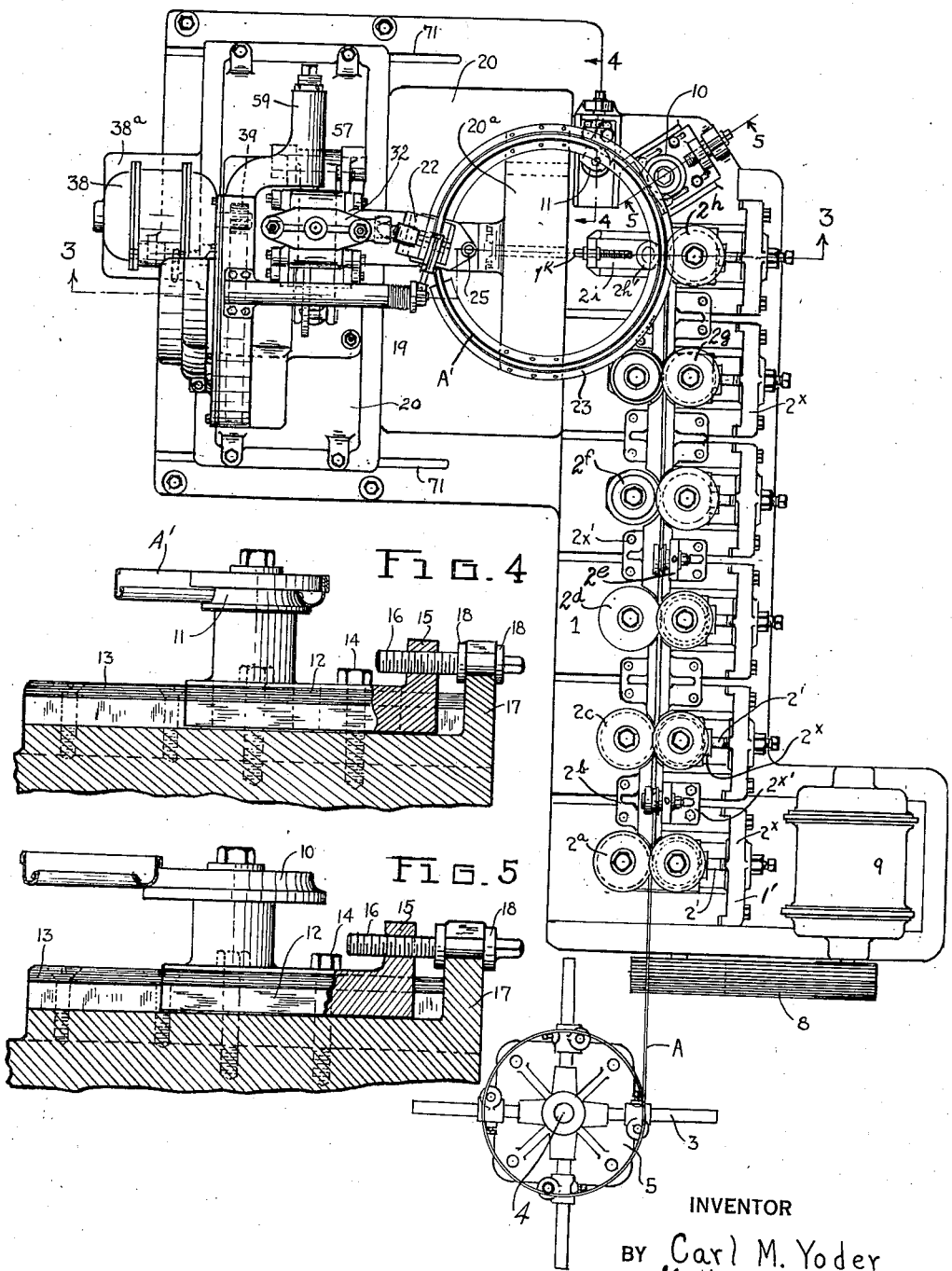
INVENTOR
BY Carl M. Yoder
Geo. B. Pitts
ATTORNEY

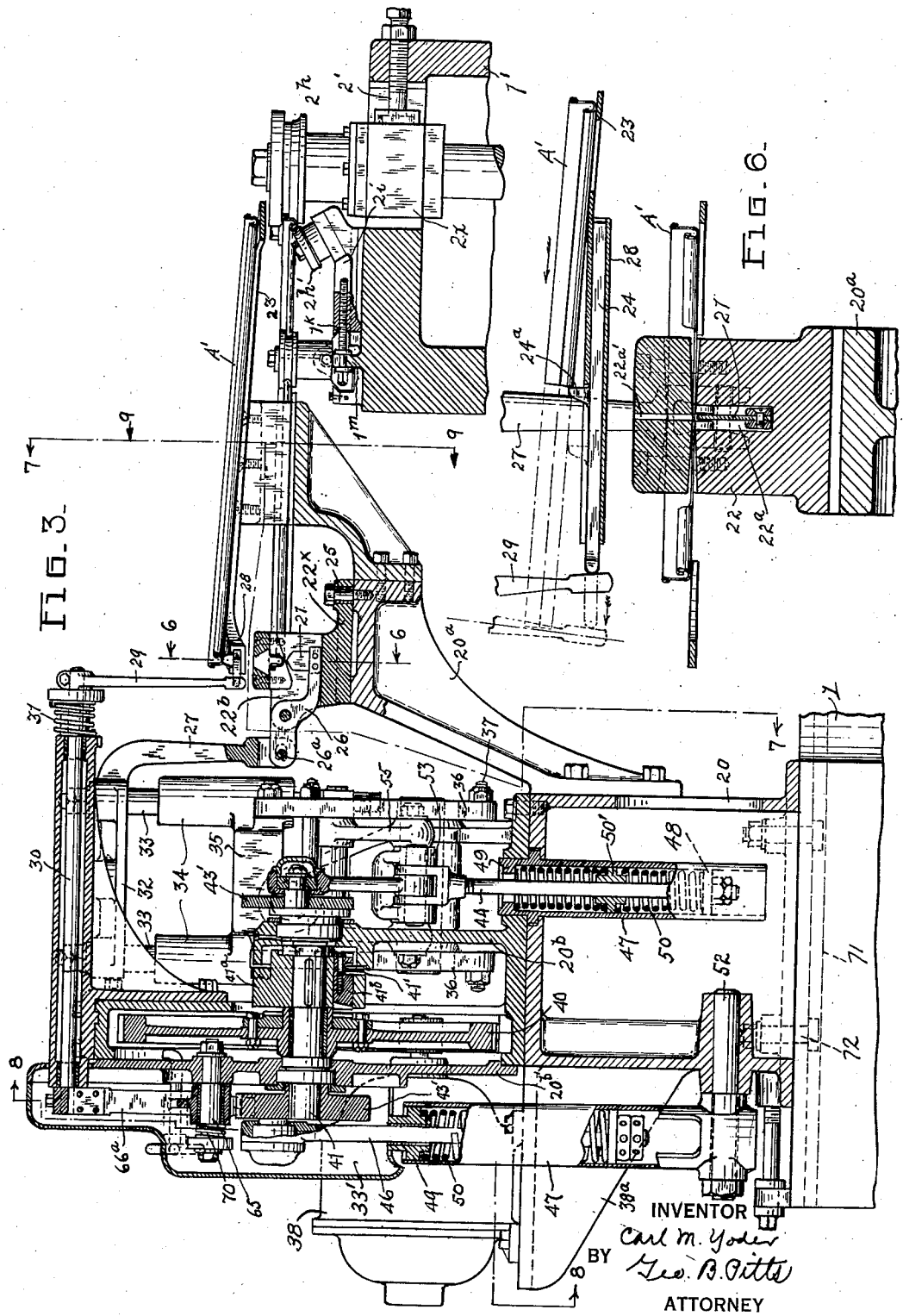

July 2, 1940.  C. M. YODER  2,206,068
MACHINE FOR PRODUCING SHAPES
Filed Aug. 28, 1936   5 Sheets-Sheet 4

INVENTOR
BY Carl M. Yoder
Geo. B. Gitts
ATTORNEY

July 2, 1940.　　　　　C. M. YODER　　　　　2,206,068
MACHINE FOR PRODUCING SHAPES
Filed Aug. 28, 1936　　　　5 Sheets-Sheet 5
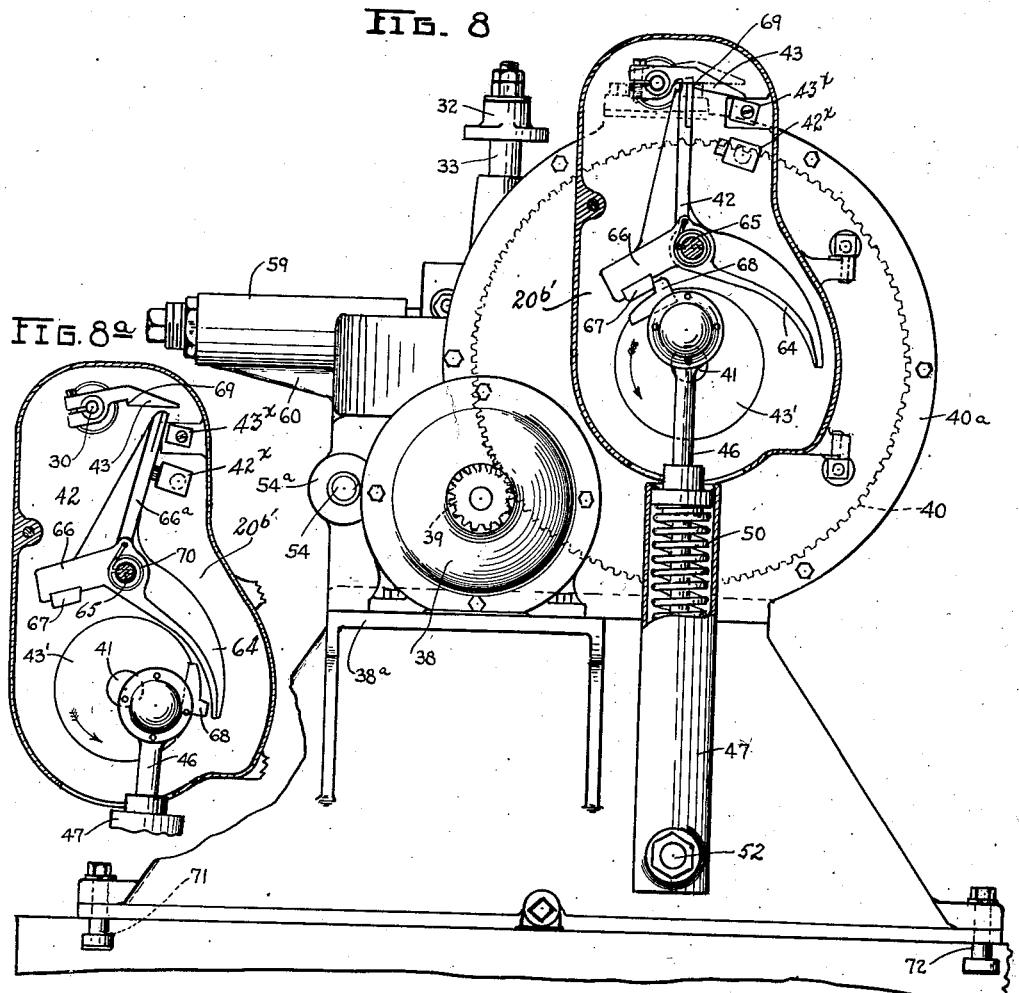
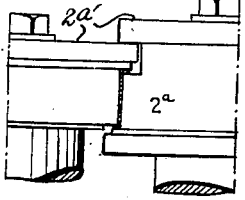
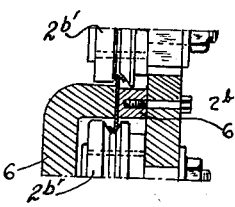
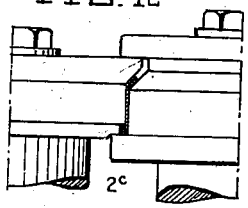
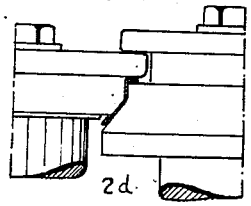
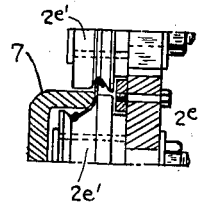
INVENTOR
BY Carl M. Yoder
Geo. B. Pitts
ATTORNEY Patented July 2, 1940

2,206,068

UNITED STATES PATENT OFFICE 2,206,068

MACHINE FOR PRODUCING SHAPES

Carl M. Yoder, Lakewood, Ohio

Application August 28, 1936, Serial No. 98,420

6 Claims. (Cl. 153—2)

This invention relates to a machine for and process of producing members of curvilinear shape struck on any predetermined radius, more particularly to a machine for and process of forming sheet material, which may be supplied in straight lengths or from a coil, into varying predetermined cross sectional shapes, curving the shaped material and cutting the curvilinear shaped or formed material into sections of predetermined length; although the invention in its broader aspects is not to be limited to the coiling or curving of material and cutting it into sections where the material is first formed to a predetermined cross sectional shape, as the machine embodying the herein disclosed invention may coil and cut into lengths sheet material that is in flat form. In the disclosed form of construction the shaped material is curved into coil form and cut into sections equal in length to a complete circle struck on the radius of the coil, whereby is produced circular members of a predetermined diameter and having a predetermined cross section, adapted to be used as hoops, reinforcing bands and the like.

One object of the invention is to provide an improved machine of this character which is relatively simple and has large capacity.

Another object of the invention is to provide an improved machine for coiling sheet material and automatically cutting it into sections.

Another object of the invention is to provide an improved machine of this character for continuously forming sheet material into a predetermined cross sectional shape, curving the shaped material on a predetermined radius and automatically cutting the material into sections.

Another object of the invention is to provide an improved process of shaping and curving material and cutting the material into sections to produce curvilinear members in a rapid manner.

Other objects of the invention will be apparent to those skilled in the art to which my invention relates from the following description taken in connection with the accompanying drawings, wherein Fig. 1 is an end elevation of a machine, embodying my invention.

Fig. 2 is a plan view.

Fig. 3 is a section on the line 3—3 of Figs. 2 and 7.

Figs. 4 and 5 are fragmentary sectional views on the lines 4—4 and 5—5, respectively, of Fig. 2.

Fig. 6 is a section on the line 6—6 of Fig. 3.

Figure 9:
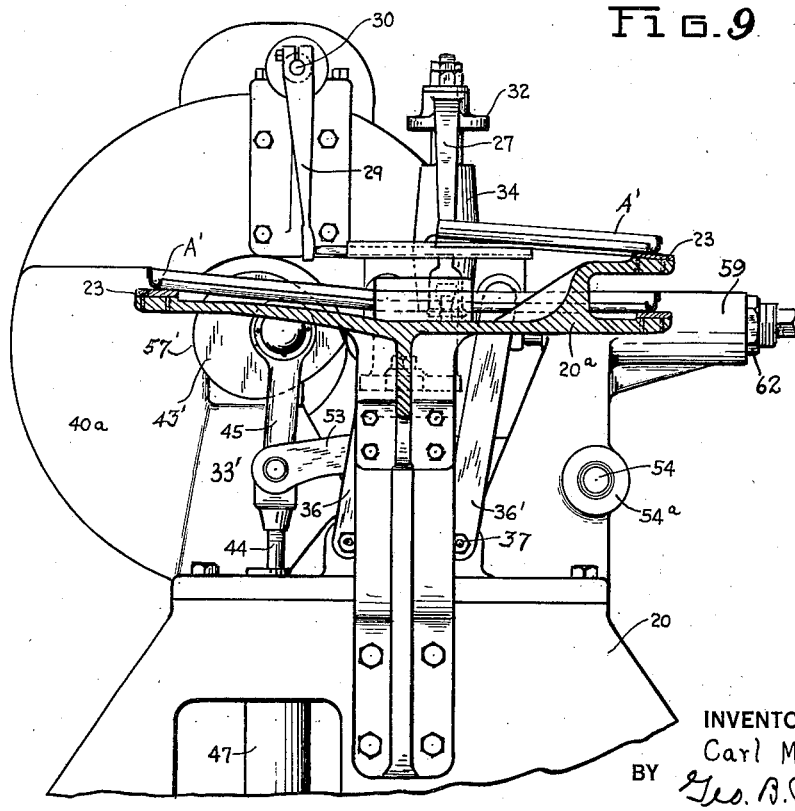
Figure 7:
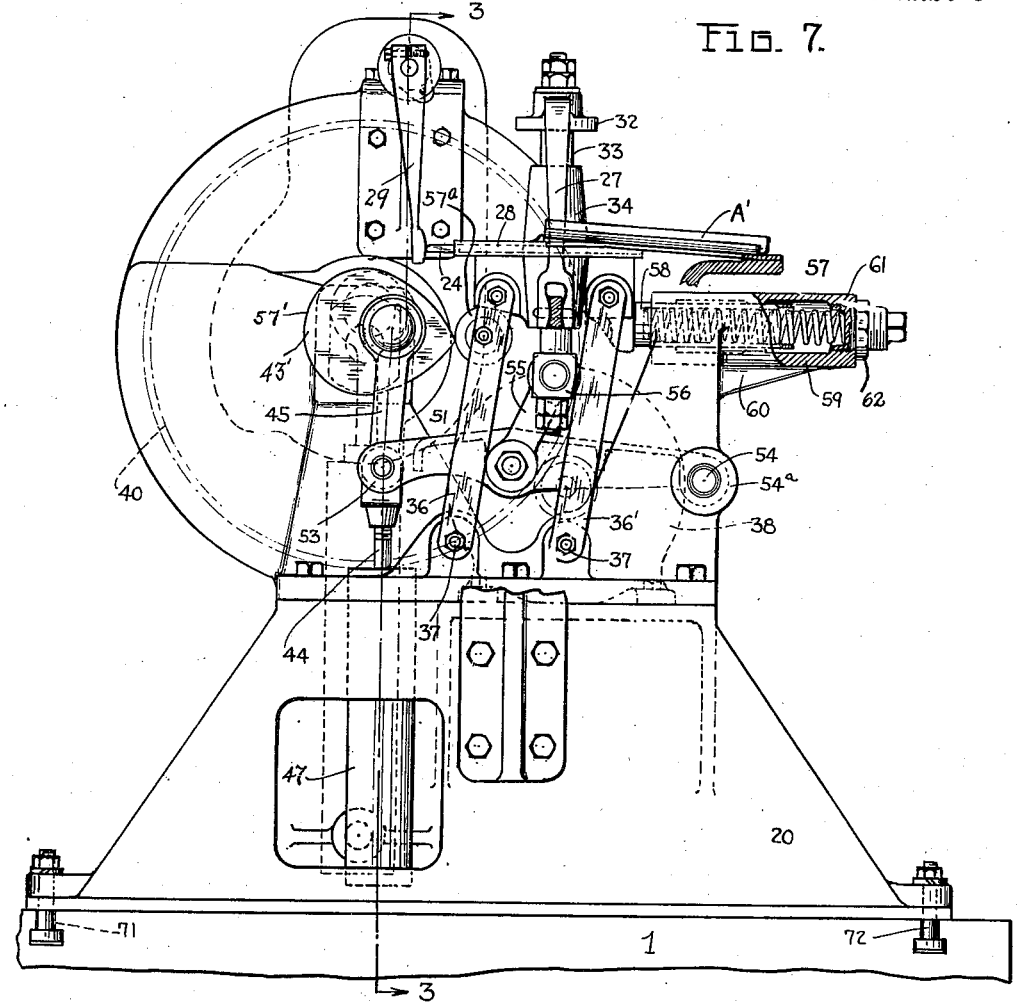
Figure 15:
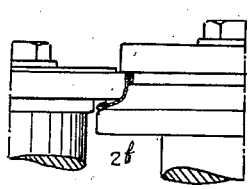
Figure 16:
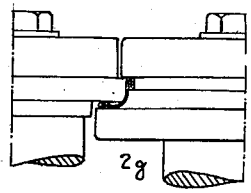
Figure 17:
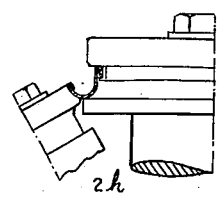

Figs. 7, 8 and 9 are sections on the lines 7—7, 8—8 and 9—9, respectively, of Fig. 3.

Figure 8a is a fragmentary sectional view taken on the same line as Figure 8, and illustrating the positions assumed by the moving parts at a later point in the cycle of operation.

Figs. 10 to 17, inclusive, are fragmentary sections, partly diagrammatic, showing the steps of shaping the material prior to coiling thereof.

Figure 18:
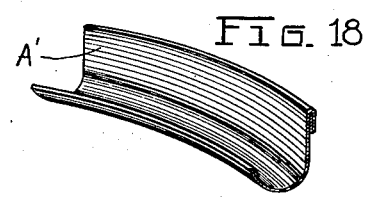

Fig. 18 is a perspective view of a portion of the shaped-up coiled material.

In the drawings, 1 indicates as an entirety a support of any suitable construction, but preferably shaped to mount the mechanisms and parts hereinafter referred to. 2 indicates as an entirety a plurality of roll passes 2a, 2b, 2c, 2d, 2e, 2f, 2g and 2h, to which the sheet material, such as sheet metal A, is delivered, to form the material into a predetermined cross sectional shape, such as shown at A' for illustrative purposes in Fig. 18. The material A may consist of hot or cold rolled sheet iron or sheet steel, brass, copper and other metallic stock. The material is preferably supplied from a coil mounted on a spider or other device 3, which in turn is rotatable on a shaft 4 supported by a suitable standard 5. In the first pass 2a (Fig. 10) its rolls 2a' bend the opposite marginal portions of the material at right angles to its central portion in opposite directions. In the next pass 2b (Fig. 11) the material A is guided between opposed guide elements 6, 6, and the rolls 2b' of the pass bend the bent-up portions at an acute angle to the central portion, and in the next pass 2c (Fig. 12) these bent-up portions are rolled into engagement with the central portion of the material and one resulting marginal edge is bent-up at an obtuse angle thereto. In the next pass 2d (Fig. 13), the central portion is bent along a longitudinal line and the bent-up edge is bent up at right angles to the contiguous portion of the material. In the next pass 2e (Fig. 14) the rolls 2e' thereof cooperate with a fixed guide 7 to transversely curve the central portion of the material and one roll operates to bend the bent-up edge at an acute angle to the contiguous portion of the material. In the next pass 2f (Fig. 15) the transverse curvature is continued and one bent-up edge is rolled into engagement with the contiguous portion of the material. The succeeding passes 2g (Fig. 16) and 2h (Fig. 17) complete the curving of the material transversely. The rolls of each pass are mounted on shafts suitably supported on the support 1, the rolls of passes 2a, 2c, 2d, 2f and 2g and one roll of the pass 2h being fixed to their shafts and the latter driven by suitable mechanism housed within the support 1.

Figure 1:
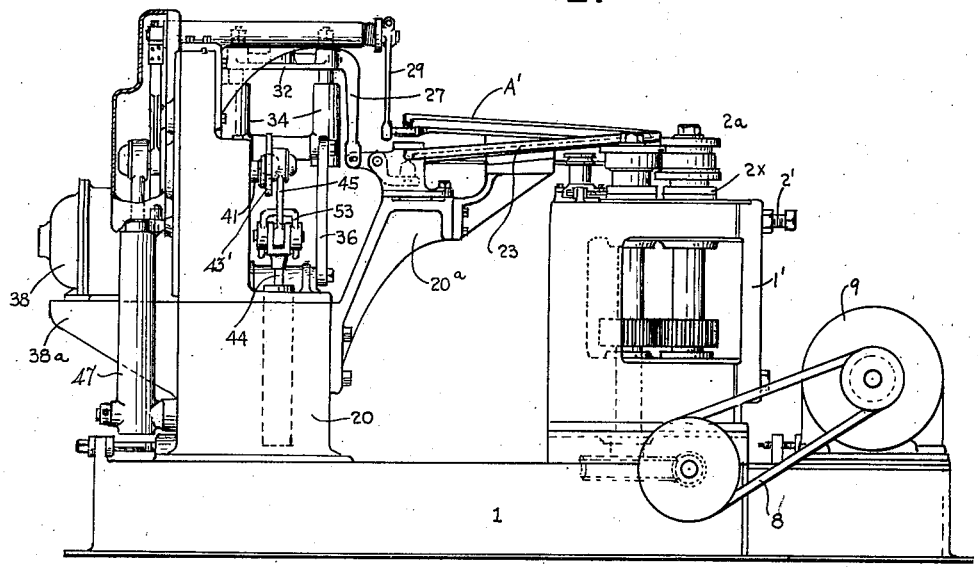

The driving mechanism is driven by a shaft having a sprocket engaged by a chain 8, which runs over a sprocket fixed to the shaft of a motor 9. It will be understood that the rolls of the passes are removable and that I may substitute therefor other rolls the co-acting surfaces of which may be adapted to form the material into other predetermined cross sectional shapes. Provision is also made for adjusting one roll of each of the passes 2a, 2c, 2d, 2f, 2g, and 2h relative to the other roll of the pass by means of a screw 2' threaded through the side wall 1' of the support 1 (see Figs. 1 and 2), the inner end of each screw being connected to the bearing box 2x for the adjacent roll shaft; whereas the shaft for each of the rolls of each pass 2b and 2e is mounted in an angle plate or member 2x' which is adjustably fixed to the support 1. Vertical adjustment of the rolls or one roll relative to an adjacent roll is provided for by shims or washers.

The non-driven roll 2h' of the pass 2h is mounted on a plate 2i which is adjustable toward and from the other roll between suitable guides on the support 1, the adjustment being provided for by a screw 1k threaded through a portion of the plate and rotatably mounted in a lug 1m on the support (see Fig. 3).

From the roll pass 2h the shaped material feeds to and between a roll 10 arranged to engage the outer side of the material and a roll 11 arranged to engage the inner side of the material (see Fig. 2). The rolls 10, 11, are respectively fixed in an adjusted position relative to the pass 2h and each other, so as to curve the material on a predetermined radius as it continues to feed between them into a curvilinear member ready to be cut into sections. In the preferred arrangement and as shown herein, the shaped material is cut into sections each forming a complete annular member, the ends of which may be secured together, end to end (as by welding), or otherwise. The rolls 10 and 11 are preferably mounted in a similar manner (see Figs. 4 and 5), each being loosely rotatable on a shaft mounted in a suitable bearing, the walls of which may be integral with a base 12. The base 12 is slidable on a portion of the support 1 between guides 13 thereon, the guides for the bases being disposed in the proper angular relation to insure a curving action by the rolls mounted on the bases.

Each base 12 is secured to the support 1 by screws 14 extending through elongated slots in the base and threaded into an opening in the support 1. Each base 12 is provided with an upstanding lug 15 having a threaded opening through it to receive an adjusting screw 16. The outer end portion of each screw 16 rotates in a bearing provided in a boss 17 on the support 1, the screw being provided with collars 18 which engage the opposite sides of the boss to prevent endwise movement of the screw when it is rotated. The outer end of each screw 16 is shaped to take a suitable tool for rotating it.

19 indicates as an entirety the mechanism for cutting the shaped material into sections of predetermined length, the operation of such mechanism being controlled by the engagement of the free end of the material, that is, the free end resulting each time a section is cut off, engaging an element of the mechanism, whereby the resulting ends of the material as the latter feeds forward effect the cutting operations successively for predetermined lengths of the material. The cutting off mechanism is so arranged that each section is equal to the circumference struck from the radius on which the shaped material is curved by the co-action of the rolls 10, 11 and pass 2h.

The cutting off mechanism 19 consists of the following: 20 indicates as an entirety a frame for supporting the power means and actuating means for a cutter or knife 21 and having a bracket 20a on which is mounted to move in opposite directions a die or guide 22, the knife being associated with the die or guide and movable with it and the material during the cutting operation. 23 indicates a circular support of convolute form, having one end leading from the discharge side of the die 22 and its other end terminating thereabove, but preferably at a point adjacent an imaginary vertical plane coinciding with the knife 21, whereby the ends of each section may be related end to end. The support 23 has a diameter corresponding to that of the coiled material so (a) as to support the latter as the end portion thereof, after each cutting operation, feeds forwardly, (b) that such advancing end portion of the coiled material is guided out of the path of the rearward coiled portion and (c) that the free end of the material may be directed into engagement with an actuating device 24, the effect of which is to cause an operation of the knife 21, whereby the advancing material is transversely cut to form a section. The actuating device is arranged so that the knife effects each cutting operation at a point on the advancing coiled material substantially coincident with the free end thereof, whereby the section constitutes a complete circular member and its ends may be aligned in abutting relation.

The die 22 consists of related elements having opposed spaced walls shaped to receive and guide the shaped curvilinear material during feeding thereof. The die is formed with a chamber 22a to accommodate the knife 21 and a slot 22a' into which the knife moves when operated. In the arrangement shown, the material is rolled or formed into substantially U-shape in cross section and by preference the knife 21 is arranged so that it engages first with the bottom of the U-shape in its movement to sever the material on a transverse line.

The die 22 on that side toward the axis on which the material is curved is provided with an arm 22x which is pivoted at 25 on the bracket 20a at a point inwardly of the adjacent portion of the material, whereby the die 22 is mounted to oscillate on the bracket 20a as later set forth. The die 22 is moved on the bracket 20a about the pivot 25 in one direction during the engagement of the knife 21 with the material to effect the cutting operation and in the opposite direction by means hereinafter referred to. On its opposite or inner side, the die 22 is provided with a bracket 22b on which is fulcrumed a rocker 26, the rocker carrying at its outer end the knife 21 and pivoted at 26a at its inner to an operating member 27. By preference, the operating member 27 serves to operate the knife 21 and through it to oscillate the die about its pivot 25 in relation to the movement of the knife. The pivotal connection 26a between the rocker 26 and arm 27 is sufficiently loose to permit of these movements.

The actuating device 24 consists of a bar mounted to reciprocate in a casing 28 and arranged to engage and operate an arm 29 (the device being preferably in contact therewith) fixed to a rock shaft 30, which is suitably supported by a portion of the frame 20. The actuating bar 24 is provided with an upstanding lug 24a which is engaged by the free end of the material to move the bar endwise, whereby, through the arm 29, the shaft 30 is rocked in one direction. The shaft 30 in turn carries a device (later referred to) which releases the mechanism (hereinafter referred to) that actuates the member 27. In the forward movement of the material A', its free end will ride beyond the end of the lug 24a, since the material feeds at an angle to the direction of movement of the device 24 (see Fig. 6) by reason of the convolute form of the support 23. A spring 31 is coiled around the shaft 30 and normally acts thereon to swing the arm 29 in the opposite direction and to return the device 24 to its first position, with its rear end in engagement with the rear end wall of the casing 28.

The operating member 27 is fixed to an upper cross-head 32 carried on the upper ends of two rods 33, which are mounted to reciprocate in tubular members 34, the down stroke of the rods 33 serving to operate the member 27, whereby the latter actuates the knife 21. A bar 35 rigidly connects the members 34 together to form a carrier for the operating member 27 during reciprocations of the rods 33. The carrier is mounted on and pivotally connected to the upper ends of pairs of links 36, 36', the lower ends of the latter being pivotally mounted at 37 on the support 20, whereby the links movably support the carrier but insure a vertical movement of the rods 33 and member 27. The movement of the carrier about the pivots 37 is co-ordinated with the movements of the rods 33 and member 27 as later set forth.

I provide for the rods 33 actuating means, indicated as an entirety at 33', which are set for operation and released by the rocking movement of the shaft 30, and power means which move the actuating means 33' into position for resetting. The actuating means are constructed to impart to the rods 33 and arm 27 a quick powerful stroke, whereby the knife 21 is operated with a quick movement. The power means consist of a motor 38 fixed to a bracket 38a, the shaft for the motor being provided with a pinion 39, which meshes with a gear 40 enclosed in a housing 40a. The gear 40 is loosely mounted on a shaft 41, the latter being supported in suitable bearings which are provided in the frame walls 20b, 20b'. The gear 40 is continuously driven by the pinion 39, but is automatically connected to the shaft 41 to rotate it through substantially a half revolution, to set or permit setting of the actuating means 33' and then automatically disconnected from the shaft to permit the shaft and the knife to operate under the influence of the actuating means, such latter operation serving to rotate the shaft through a substantially half revolution and to effect movement of the knife 21 to cut the shaped material A', as already set forth. The driving connection from the gear 40 to the shaft 41 consists of a clutch, one element thereof consisting of a hub 41a keyed to the shaft and a plunger 41b slidably mounted therein and normally biased into engagement with the other clutch element (which is secured to the gear 40), but is moved away from said other clutch element by a cam 41'. The cam 41' is so arranged that when the shaft 41 is rotated by the gear 40 to that position where the actuating means 33' are or become effective to rotate the shaft 41, it causes the movable clutch plunger 41b to disengage the clutch element fixed to the gear 40, whereas the shaft operates a trigger device 42 which, following such disengagement, engages a release element or device 43 carried by the rock shaft 30, and locks or sets the shaft 41 against rotation.

The actuating means 33' consist of the following: 43' indicates a crank disk fixed to the shaft 41 and connected to a pitman 44 through a link 45. I prefer to employ two crank disks 43' fixed to the opposite ends of the shaft 41, the second disk being connected to a pitman 46. The outer end portion of each pitman 44, 46, extends into a cylinder 47 and carries at its outer end an abutment 48 consisting of a washer or collar held in position by one or more nuts threaded on the end of the pitman. Between the abutment 48 on each pitman and an annular wall 49 at the inner end of the cylinder I provide one or more coiled springs 50, which are compressed and put under tension when the shaft 41 is rotated by the gear 40, substantially a half revolution, as above set forth, and the shaft is locked against rotation by the trigger device 42. Accordingly, if the trigger device 42 is operated to release the shaft 41 the springs 50 will impart a quick movement to the shaft 41, rotating it through substantially the other half revolution, and through a leverage, indicated as an entirety at 51, operate the rods 33 and the parts connected thereto downwardly, thus effecting a cutting stroke of the knife 21. The cylinder 47 for the pitman 46 and its operating spring is pivoted at its lower or outer end on a shaft 52, suitably supported in the frame since the pitman 46 is connected directly to the adjacent crank disk; whereas the cylinder 47 for the pitman 44 is vertically disposed and fixedly supported between walls of the frame 20 since the pitman 44 and the link 45 serve as a conjoint connection between the shaft 41 and the leverage 51 to eliminate the necessity of providing a separate connection and driving means between the leverage and the shaft 41. In other words, I utilize this arrangement to change the rotary motion of the shaft 41 into a reciprocating movement of the rods 33. Where two or more springs 50 are provided in each cylinder 47, I prefer to mount between the adjoining ends of the springs a disk 50', loosely fitting the pitman and cylinder walls, to serve as a guide.

The leverage 51 consists of the following: 53 indicates a lever bifurcated at its inner end and terminating in knuckles through which the pin for pivotally connecting the pitman 44 and link 45, extends. The outer end of the lever 53 is suitably fulcrumed on a shaft 54 which is supported in hollow bosses 54a. 55 indicates links disposed on the opposite sides of the lever 53 and pivotally connected thereto at their outer ends. The opposite ends of the links 55 are connected to a cross head 56 on and connecting the lower ends of the rods 33 together, whereby movement of the pitman 44 effects movement of the rods 33.

To insure movement of the knife 21 and die 22 with the shaped material A', I provide means, indicated as an entirety at 57, for oscillating the carrier about the pivots 37 for the links 36, 36' in coordination with the reciprocations of the rods 33 and arm 27, whereby the die and knife move with the material during the cutting stroke. The oscillating means 57 comprise the following: 57' indicates a cam fixed to the shaft 41 and arranged to engage the carrier or a part connected thereto. The cam 57' is preferably provided on the side wall of one of the crank disks 43', preferably the disk to which the link 45 is connected. 58 indicates a plunger engaging the carrier and slidably fitting a barrel 59 preferably formed integrally with a bracket 60, which is mounted on the frame 20. The plunger 58 is recessed to form a guide for a coiled spring 61 which is mounted between an abutment 62 at the outer end of the barrel (the abutment preferably comprising a plug screwed into the outer end of the barrel and serving as an adjustment to increase or decrease the tension of the spring 61) and the bottom wall of the recess, the spring normally tending to move the plunger 58 inwardly and through it to swing the carrier toward the left, as viewed in Fig. 7, and to maintain the carrier in engagement with the cam 57'. 57a indicates a roller, loosely mounted on a shaft supported on the adjacent link 36 and in the plane of the cam 57' so as to ride thereon during its rotation. The cam 57' operates to swing the carrier and parts carried thereby through the roller 57a and link 36 in one direction (toward the right as viewed in Fig. 7) and the spring 61 operates to swing the carrier in the opposite direction, the cam being shaped to control the movement of the carrier under the influence of the spring; and as the spring normally maintains the carrier in engagement with the cam at all times, the cam and spring co-act to effect and control the oscillating movement of the carrier. As the cam 57', link 45 and pitman 44 are connected to the shaft 41, it will be seen that the vertical and oscillating movements of the rods 33 are correlated. As the arm 27 is accordingly reciprocated and oscillated with the carrier, the die 22 will be oscillated about the pivot 25, whereby the knife 21 and die 22 move as a unit with that portion of the material feeding through the die and the knife is operated simultaneously to cut the material. The walls of the die 22 are spaced or separated at either side of the slot 22a' to permit of the feeding of the material therethrough and to accommodate the movement of the die on a radius less than that on which the material is coiled. The die 22 is formed of separable and removable elements to provide for material having different predetermined cross sections.

The trigger device 42 comprises substantially a bell crank having a tail member 64, fulcrumed on a stud shaft 65 which is mounted on the wall 20b'. One arm 66 of the device 42 is provided with a lug 67 arranged to engage a projection 68 on the adjacent crank disk 43' and lock the shaft 41 against turning under the influence of the actuating means 33'. The other arm 66a of the device 42 is arranged to engage the shoulder 69 provided on the release device 43, when the projection 68 is in engagement with the lug 67. A spring 70 coiled around the shaft 65 and connected to the trigger device 42 normally tends to swing the latter clockwise, as viewed in Fig. 8, so that upon the rocking of the shaft 30 (as already set forth), the device 43 will be swung to the position shown in dotted lines in Fig. 8 and release the trigger device 42; the latter in turn will disengage the projection 68 and permit the actuating means to rotate the shaft substantially a half revolution, and effect a cutting of the material, as above set forth. The rotation of the shaft 41, through the other half revolution is effected by the motor 38 and as the projection 68 is carried around in the latter half revolution, it engages with and rides on the tail member 64 (see Fig. 8a) and acts therethrough to swing the trigger device 42 counterclockwise, to move the arm 66a thereof behind the shoulder 69 and to position the lug 67 in the path of movement of the projection 68. The shaft 41 is rotated by the gear 40 to compress the springs 50 and to a position wherein the springs are (or one thereof is) effective to rotate the shaft, following which, but prior to the engagement of the projection 68 with the lug 67, the gear 40 is disconnected from the shaft, so that upon engagement of the projection 68 with the lug 67, the latter stops the further rotation of the shaft, with the actuating means set.

The pitmans 44 and 46 are connected to the disks 43' at different angular positions so that in the operation of the shaft 41 under the influence of the springs 50, one thereof (the spring connected to pitman 46) will continue to exert torque on the shaft after the other spring has fully expanded, the effect of which is to insure a full or maximum power stroke of the knife 21.

The frame 20 is adjustably mounted on the support 1 so that the die 22 and knife 1 may be accurately positioned with respect to the coiled material A', this arrangement permitting the entire cutting off mechanism to be bodily adjusted. The adjustment is provided for by forming in the support 1 elongated slots 71 to receive bolts 72 which extend through the marginal portions of the frame 20 to clamp the latter to the support 1. The slots 71 extend parallel to that radius of the coiled material extending through the knife 21, whereby such adjustment moves the latter along this radius.

The power and actuating means herein disclosed are substantially similar to the means shown and claimed in the application of Alexander Borzym, filed Feb. 9, 1934, Ser. No. 710,430, now Letters Patent No. 2,155,396, dated April 25, 1939, and no claim is made thereto by me.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

It will be noted that in my form of construction the material is supported and fed at one side of the power means and actuating means 33' for the cutting off mechanism, and independently thereof and that the knife is supported to engage and move with the material. This arrangement is obviously advantageous for cutting material that is curved or coiled about a substantially vertical axis; but it is also advantageous for cutting variously shaped material since the changes or substitutions of supporting and die parts are materially simplified and would involve no changes, substitution or disassembly of the power means or actuating means.

What I claim is:

1. In apparatus of the class described, the combination of material feeding means, means for continuously curving the material on a predetermined radius, mechanism for cutting the curved material into predetermined lengths, said mechanism including a cutter mounted to move in opposite directions in the plane of the material, whereby it moves with the material during the cutting stroke, an actuating device arranged to control the operation of said mechanism, and a curved support and guide for the advancing end portion of the curved material arranged to guide such end portion laterally of the remaining portion of the material, said device being normally disposed in the path of movement of the free end of the material and arranged to be engaged and operated by such end as it leaves said support.

2. In apparatus of the class described, the combination of means for feeding sheet material, means for forming the material into a predetermined cross sectional shape, means for curving the shaped material on a predetermined radius, supporting means for deflecting the end of the curved material laterally, mechanism for cutting the coiled material into predetermined lengths and means engaged by the said end for actuating the cutting mechanism.

3. In apparatus of the class described, the combination of means for feeding sheet material, a plurality of roll passes for forming the material into a predetermined cross sectional shape, means co-acting with the last roll pass for curving the shaped material on a predetermined radius, supporting means for deflecting the end of the curved material, mechanism for cutting the coiled material into predetermined lengths and means engaged by the said end for actuating the cutting mechanism.

4. In apparatus of the class described, the combination of means for feeding sheet material, means for curving the material on a predetermined radius, a spiral support on which the material moves, a cutting device on an intermediate portion of said support, mechanism for operating said device and for moving it and the said intermediate portion of the support with the material during the cutting action, operation of said mechanism being controlled by the free end of the coiled material as it passes beyond said spiral support.

5. In apparatus of the class described, the combination of means for feeding sheet material, means for curving the material on a predetermined radius, supporting means for advancing and guiding the end portion of the curved material out of its plane, mechanism for cutting the curved material into sections, and means actuated by the guided portion of the material for controlling the operation of said mechanism.

6. In a machine of the class described, the combination of a horizontally disposed spiral support, mechanism including a cutter on said support intermediate the ends thereof and operating mechanism for said cutter, mechanism for feeding material to said support, said feeding mechanism including means for curving the material, said support serving to guide the advancing end portion of the material to one side of said cutter, and a device in the path of movement of the advancing end of the material and disposed in a predetermined relation to said cutter and arranged to be engaged and moved by said advancing end for controlling the operation of said cutter operating mechanism.

CARL M. YODER.